United States Patent

Daichou et al.

[11] Patent Number: 5,985,465
[45] Date of Patent: Nov. 16, 1999

[54] LAMP REFLECTOR MOLDING COMPOSITION, LAMP REFLECTOR, AND HEADLAMP

[75] Inventors: Hisayoshi Daichou; Yuji Yoshimoto, both of Shizuoka, Japan

[73] Assignee: Koito Manufacturing Co., Ltd., Tokyo, Japan

[21] Appl. No.: 08/681,478

[22] Filed: Jul. 23, 1996

[30] Foreign Application Priority Data

Jul. 27, 1995 [JP] Japan .................................... 7-192026
Jun. 24, 1996 [JP] Japan .................................... 8-163266

[51] Int. Cl.$^6$ .......................... G03B 21/28; B32B 15/08; B32B 15/14; C04B 14/42
[52] U.S. Cl. .......................... 428/458; 428/432; 428/461; 428/469; 362/538; 353/98; 106/491
[58] Field of Search .................................... 428/457, 228, 428/332, 458, 461, 432, 469, 480; 362/341, 347, 538, 84; 349/67; 353/98; 359/584; 106/287.24, 489, 14.44, 38.2, 491

[56] References Cited

U.S. PATENT DOCUMENTS

| | | | |
|---|---|---|---|
| 3,665,055 | 5/1972 | Hatton et al. | 260/862 |
| 4,280,949 | 7/1981 | Dieck | 260/40 R |
| 4,341,877 | 7/1982 | Das et al. | 523/409 |
| 4,387,823 | 6/1983 | Shiba | 220/4 R |
| 4,476,274 | 10/1984 | Liu | 524/445 |
| 4,672,086 | 6/1987 | Seiler et al. | 524/127 |
| 4,868,231 | 9/1989 | Lenke et al. | 523/512 |
| 5,077,326 | 12/1991 | Shibata et al. | 523/523 |
| 5,104,581 | 4/1992 | Ho et al. | 252/511 |
| 5,143,964 | 9/1992 | Behar et al. | 524/400 |
| 5,179,152 | 1/1993 | Shimaoka | 524/494 |
| 5,246,983 | 9/1993 | Shibata et al. | 523/219 |
| 5,260,368 | 11/1993 | Benkhoucha | 524/494 |
| 5,283,542 | 2/1994 | Ochiai et al. | 335/6 |
| 5,395,865 | 3/1995 | Akiyama et al. | 523/510 |
| 5,412,003 | 5/1995 | Akiyama et al. | 523/513 |
| 5,420,179 | 5/1995 | Fourquier | 523/523 |
| 5,476,908 | 12/1995 | Kishi et al. | 525/393 |
| 5,491,184 | 2/1996 | McBain et al. | 523/436 |
| 5,498,763 | 3/1996 | McGarry et al. | 428/229 |
| 5,519,094 | 5/1996 | Tseng et al. | 525/440 |

OTHER PUBLICATIONS

Hans–Georg Elias, An Introduction to Plastics, 1993 (no month), pp. 6,7.

*Primary Examiner*—John J. Zimmerman
*Assistant Examiner*—Michael LaVilla
*Attorney, Agent, or Firm*—Sughrue, Mion, Zinn, Macpeak & Seas, PLLC

[57] ABSTRACT

A molding composition for a lamp reflector is disclosed, which comprises an unsaturated polyester resin, glass fiber, inorganic filler and a thermoplastic resin in an amount effective for preventing shrinkage of the molding composition during curing of the composition to form the lamp reflector; and a process for producing the lamp reflector and a lamp reflector produced by molding the molding composition are also disclosed.

20 Claims, 2 Drawing Sheets

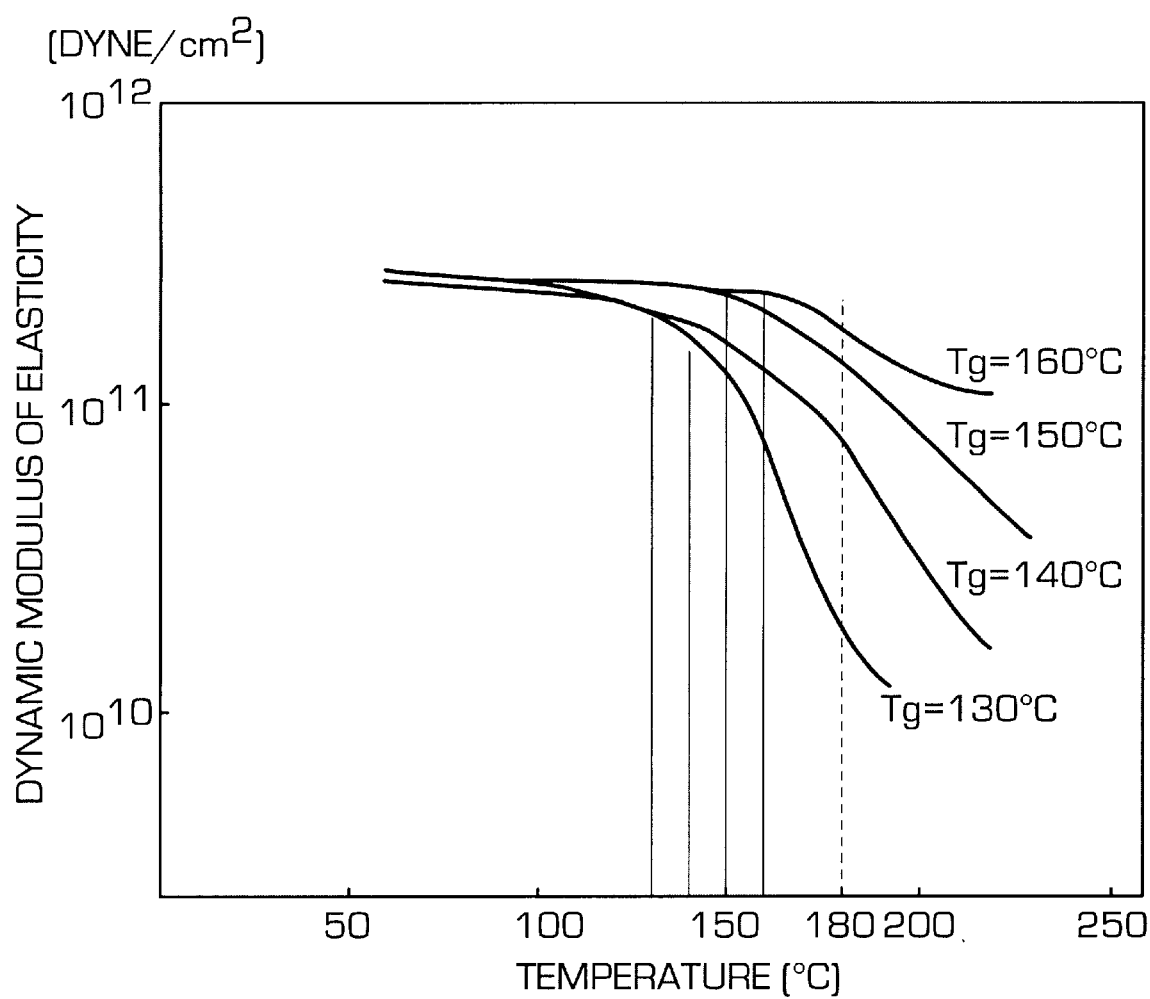

LAMP REFLECTOR MOLDING COMPOSITION, LAMP REFLECTOR, AND HEADLAMP

BACKGROUND OF THE INVENTION

1. Field of the Invention

The present invention relates to a molding composition or material which is suitable for use as a lamp reflector, more particularly, a molding composition suitable for use as a lamp reflector in headlamps, fog lamps, and other lamps provided in automobiles, as well as a process for producing a lamp reflector using the molding composition, and a lamp reflector.

2. Description of the Related Art

Since lamps, particularly headlamps, fog lamps and other lamps, use very high intensity bulbs, reflectors for these lamps must withstand the intense heat emitted from filaments during use of the lamps. For this reason, substrates for reflectors are formed of thermosetting resins, and unsaturated polyester molding compositions have conventionally been used for this purpose.

For example, a conventional reflector composition comprises a thermosetting unsaturated polyester, 12 to 18% by weight glass fiber and, incorporated into the molding composition, a filler, such as calcium carbonate, a fatty acid ester which acts as a compatible release agent, and an aliphatic peroxy compound which acts as a curing catalyst.

High heat resistance, enough to withstand the temperature (about 180° C.) of heat emitted when the lamp is in an "on" state, is required of the unsaturated polyester resin used in the lamp reflector. The use of the conventional polyester molding composition as a substrate material for a lamp reflector, however, results in thermal deformation of the lamp reflector due to the increase in temperature within a lamp chamber of the lamp when the lamp is in an "on" state. Further, it has been found that shrinkage during thermal curing at the time of injection molding of the lamp reflector causes shrinkage of the substrate, which deteriorates the dimensional stability and surface smoothness of the reflector. This, in turn, creates strain on the surface of the reflector, and the strain renders the surface of the reflector uneven, making it difficult to accurately control light emitted from the bulb. Consequently, problems occur including that drivers of oncoming cars are "dazzled" by the glare of the light emitted from the lamp, and light distribution standards cannot be satisfied.

Since this type of reflector for a high intensity lamp should have a highly accurate reflecting surface which is free from optical aberrations, it is necessary to develop a thermosetting plastic molding material which can be used as a substrate for a reflector, the material having excellent heat resistance, dimensional stability, surface smoothness and strength.

SUMMARY OF THE INVENTION

The present invention solves the above problems and other problems and is characterized by molding a lamp reflector from a composition comprising unsaturated polyester resin, glass fiber, inorganic filler, and thermoplastic resin.

When a thermoplastic resin is incorporated into the composition according to the present invention, the thermoplastic resin is expanded by heat generated at the time of thermal setting of the composition to compensate for the shrinkage on curing of the whole system. Consequently, the volume of the resultant reflector can be kept constant, thus enabling the construction of the high-accuracy reflecting surface free from optical aberrations.

BRIEF DESCRIPTION OF THE DRAWINGS

FIG. 2 is a graph showing the temperature dependence of the modulus of elasticity for various unsaturated polyesters.

DETAILED DESCRIPTION OF THE PREFERRED EMBODIMENTS OF THE INVENTION

Figure 1:
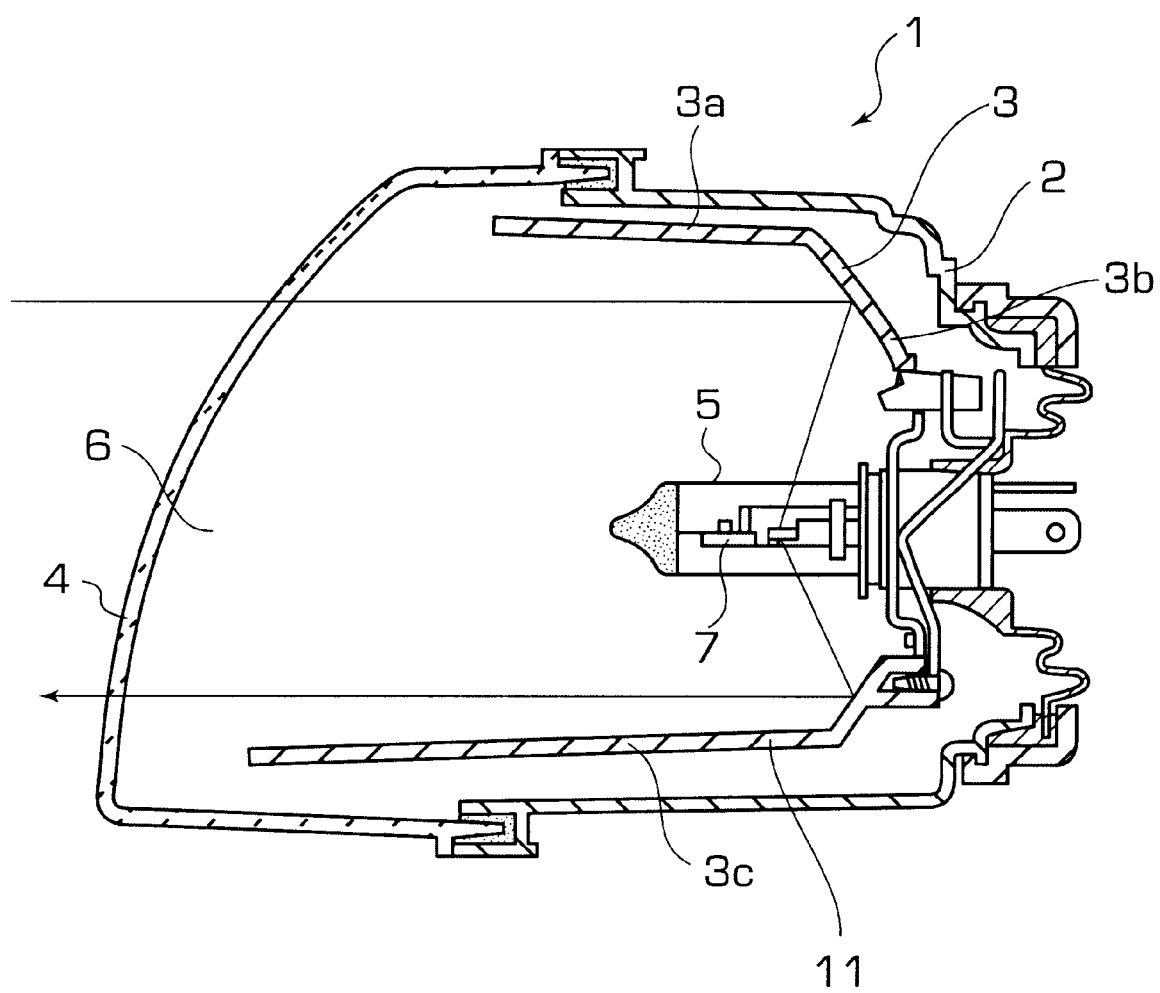
FIG. 1 is a cross-sectional view of the headlamp for a vehicle, the headlamp having a reflector substrate of the molding composition of the present invention.

According to the present invention, in the molding material for the lamp reflector, conventional unsaturated polyester resin, crosslinking agent, and catalyst may be used as the thermosetting resin substrate.

The glass transition temperature of the cured product which is used as the resin substrate in accordance with the present invention, and which is prepared from an unsaturated polyester resin and a crosslinking agent, has a glass transition temperature of preferably 150° C. or above, more preferably 160° C. or above, such that it will withstand withstanding heat having a high temperature of 180° C. or above, which is generated from a filament. When the glass transition temperature of the cured product is 150° C. or above, a satisfactory modulus of elasticity at a high temperature can be ensured. This prevents the reflecting surface from developing "waviness" when the lamp is in an "on" state, thereby maintaining the optically good geometry of the reflecting surface.

The unsaturated polyester resin used in the present invention may be prepared by any suitable technique including polycondensation of an unsaturated polybasic acid and, if necessary, a saturated polybasic acid, with a polyhydric alcohol. Other suitable techniques will be apparent to one skilled in the art.

Any suitable unsaturated polybasic acid may be used in the polycondensation. Maleic anhydride, fumaric acid, itaconic acid and the like are preferably used as the unsaturated polybasic acid, and among them, maleic anhydride and fumaric acid are particularly preferred. Other unsaturated polybasic acids will be apparent to one skilled in the art.

Similarly, any suitable saturated polybasic acid may be used in the polycondensation. Preferred examples of the saturated polybasic acid include phthalic anhydride, isophthalic acid, terephthalic acid, tetrahydrophthalic anhydride, methyltetrahydrophthalic anhydride, endomethylenetetrahydrophthalic anhydride, adipic acid, sebacic acid, HET acid, and tetrabromophthalic anhydride. Among them, phthalic anhydride and isophthalic acid are preferred. Other saturated polybasic acids will be apparent to one skilled in the art.

Also, any suitable polyhydric alcohol may be used in the polycondensation. Examples of the polyhydric alcohol include ethylene glycol, propylene glycol, diethylene glycol, dipropylene glycol, neopentyl glycol, 1,3-butanediol, 1,4-butanediol, 1,6-hexanediol, bisphenol A hydride, bisphenol A/propylene oxide adduct, dibromoneopentyl glycol, pentaerythritol diallyl ether, and allyl glycidyl ether. Particularly preferred are ethylene glycol, propylene glycol, diethylene glycol, dipropylene glycol, neopentyl glycol, 1,3-butanediol, and bisphenol A hydride. Other polyhydric alcohols will be apparent to one skilled in the art.

Preferably, the unsaturated polyester resin comprises 4 to 20% by mass of the composition of the present invention, more preferably 6 to 13%, based upon the total mass of the molding composition.

Any suitable crosslinking agent and catalyst may be used in the present invention. The crosslinking agent may be a styrene monomer, and the catalyst is preferably an organic peroxide, such as t-butyl peroxide. Other suitable crosslinking agents and catalyst will be apparent to one skilled in the art.

Preferably, the crosslinking agent is used in an amount of 5 to 25% by mass, more preferably, 6 to 13%. Also, the catalyst may be used in an amount of 0.2 to 5% by mass, more preferably, 0.2 to 3% by mass.

In the present invention, as mentioned above a thermoplastic resin is included for the purpose of preventing shrinkage of the unsaturated polyester resin during curing thereof.

Any suitable thermoplastic resin may be used in the invention. Examples of the thermoplastic resin include a styrene copolymer, polyethylene, polyvinyl chloride, polyvinyl acetate, polyvinyl alcohol, polymethyl methacrylate, polymethyl methacrylate copolymer, modified ABS resin, cellulose acetate butyrate, polycaprolactone, styrene-butadiene rubber, chloroprene rubber, and modified polyurethane. Among them, acrylic resins such as polymethyl methacrylate (including copolymers thereof with, for example, styrene-acrylic copolymer, styrene-polyester copolymer) and vinyl acetate resins such as polyvinyl acetate (including copolymers thereof with, for example, styrene-vinyl acetate copolymer) are preferred from the viewpoint of dispensability, low shrinkage, and rigidity. Other thermoplastic resins will be apparent to one skilled in the art.

The amount of the thermoplastic resin present in the composition of the present invention is preferably 2 to 12% by mass, based upon the total mass, more preferably 2.4 to 8% by mass.

The thermoplastic resin used in the present invention causes thermal expansion due to heat (typically at 140 to 180° C.) generated by a self-exothermic process at the time of curing of the unsaturated polyester resin. In order for the thermoplastic resin to satisfactorily exhibit such a property, the glass transition temperature of the thermoplastic resin is preferably 150° C. or below, more preferably 120° C. or below. When the glass transition temperature is 150° C. or below, the thermoplastic resin is satisfactorily expanded during molding, sufficiently preventing shrinkage due to curing of the unsaturated polyester.

In the present invention, the dimensional stability and the surface smoothness of the lamp reflector can be enhanced by controlling the degree of the shrinkage of the substrate and the degree of the expansion of the thermoplastic resin.

In particular, when the glass transition temperature of the unsaturated polyester resin is 150° C. or above, it is possible to prevent the lowering of the modulus of elasticity of the substrate for a reflector when the lamp is in an "on" state, thereby enabling the thermal deformation of the substrate for a reflector to be effectively prevented. In this case, the incorporation of the thermoplastic resin having a glass transition temperature of 150° C. or below can effectively prevent shrinkage during curing of the thermosetting resin, thereby enabling a reflecting surface to be formed with a good accuracy. That is, it is possible to achieve a good balance of heat resistance and dimensional stability which are contradictory properties.

In a preferred embodiment of the invention, an unsaturated polyester resin having a glass transition temperature of at least 150° C., more preferably, at least 160° C., is used in combination with an acrylic resin such as polymethyl methacrylate (including a copolymer thereof with for example, styrene-acrylic copolymer or styrene-polyester copolymer) or a vinyl acetate resin such as polyvinyl acetate (also including a copolymer thereof with, for example, styrene-vinyl acetate copolymer) having a glass transition temperature of 150° C. or below, more preferably, of 120° C. to −10° C., whereby excellent dispensability, dimensional stability, rigidity, and heat resistance are achieved, resulting in the formation of a good lamp reflector.

In order to achieve strength high enough to prevent the lamp reflector from falling off of a vehicle or from being damaged during vehicle use, glass fiber is added to the molding composition of the present invention as a reinforcement. The amount of the glass fiber added to the composition is preferably 5 to 30% by mass, more preferably 10 to 25% by mass, based on the total mass of the molding composition. When it falls within the above range, satisfactory impact strength can be provided without causing adverse effect on the surface roughness of the molded product. The diameter of the glass fiber is preferably in the range of from 6 to 18 μm. When it falls within the above range, suitable fluidity and strength can be ensured.

Further, inorganic fibers are added to the molding composition of the present invention. Any suitable inorganic filler may be used in the present invention, such as calcium carbonate, mica, talc, graphite, carbon black, asbestos, and aluminum hydroxide. Other inorganic fillers will be apparent to one skilled in the art. Although the amount of the inorganic filler added is not particularly limited, it is preferably in the range of from 35 to 70% by mass, more preferably, 45 to 65% by mass, based upon the total mass of the molding composition.

Further, in order to release the low-shrinkage molded article from the mold, an internal release agent is preferably added to the molding composition of the present invention. Any suitable internal release agent may be used in the present invention. Fatty acid metal salts, such as zinc stearate, magnesium stearate, calcium stearate, and aluminum stearate, are preferably used as the internal release agent. Other internal release agents will be apparent to one skilled in the art. The amount of the internal release agent added to the molding composition is preferably in the range of from 0.5 to 6% by mass, more preferably, 0.5 to 4% by mass, based on the total mass of the mold composition. When it is not less than 0.5% by mass, the molded product can be stably released from the mold without causing cracking. On the other hand, when it is not more than 4% by mass, surface treatment (primer coating) of a reflecting surface necessary as the reflector can be easily carried out, ensuring satisfactory coating leveling and adhesion.

Further, pigments, polymerization inhibitors (for example, quinones, hydroquinones, phenols, organic and inorganic copper salts, amidines, hydrazine, quaternary ammonium salts, amines, nitro compounds, oximes, sulfur, polyhydric phenols, and amine hydrochlorides), thickeners (for example, alkaline earth metal oxides such as magnesium oxide and calcium oxide), may be included in the molding composition of the present invention.

Referring now to FIG. 1, in a headlamp 1 for a vehicle, a lamp chamber 6 is defined by a lamp body 2 and a front lens 4 mounted on a front opening of the lamp body 2, and a reflector 3 and a bulb 5 mounted on the reflector, are all housed in the lamp chamber 6. The reflector 3 comprises a main reflecting surface 3b, formed of a radiation surface or the like, and flat surfaces 3a, 3c formed on and beneath the main reflecting surface 3b so as for the main reflecting surface to be put between the flat surfaces. The surface of the reflector includes an undercoat of aluminum vapor-deposited thereon to render the surface reflective, and a top coat.

As soon as the bulb 5 is turned on, light emitted from a filament 7 is reflected forward by the reflecting surface 3a and directed ahead of the vehicle, thereby providing forward illumination. The temperature within the lamp housing 6 is raised by heat generated from the bulb 5. In particular, the surface temperature of the reflector 3 reaches about 180° C. For this reason, material selection should be conducted so that the reflector, particularly the surface of the reflector, can withstand such high temperatures.

The reflector 3 is formed of the unsaturated polyester molding composition according to the present invention. In a preferred embodiment in accordance with the present invention, a molding composition comprising 4 to 20% by mass of an unsaturated polyester, 5 to 30% by mass of a glass fiber, 35 to 70% by mass of an inorganic filler, and 2 to 12% by mass of a thermoplastic resin and, optionally, mixed and dispersed in the above components, 5 to 25% by mass of a crosslinking agent, 0.2 to 5% by mass of a catalyst, and 0.5 to 6% by mass of an internal release agent, may be placed in a mold having a suitable shape by injection molding or injection compression molding and then heated to cure the composition, thereby preparing a substrate 11 for a reflector 3. In order to evacuated the space within the mold cavity prior to the injection, a tank connected to a vacuum source is preferably connected to the mold to remove air within the mold cavity prior to the injection.

In curing the composition, the mold may be heated to a temperature of, preferably, 130 to 200° C., more preferably 140 to 180° C. The curing time, which can be set depending upon the thickness of a contemplated substrate for reflector, is preferably from about 0.5 to 4 min.

According to the present invention, little or no shrinkage on curing of the composition occurs, and surface conditions of the substrate for a reflector, after release from the mold are very good with the surface being free from strain and lustrous.

Subsequently, a primer is preferably coated as an undercoat on the surface of the reflector 3 in a conventional manner to activate the surface. In this regard, at least one lacquer may be coated on the primer coat, and coating of a metal, such as aluminum, is then formed thereon by vacuum deposition or sputtering to form a reflector surface. The lacquer adheres to the reflector surface and the reflective aluminum coating and preferably comprises a polyester, polybutadiene, epoxy, acrylic or alkyd resin or the like. In addition, a protective coating of a lacquer may be provided on the metallic coating.

The present invention will be explained below with reference to examples but the present invention is not limited thereto.

EXAMPLE 1

10% by mass of an unsaturated polyester (a product by polycondensed from maleic acid, o-phthalic acid, propylene glycol and neopentyl glycol; the glass transition temperature of the unsaturated polyester being as specified in Table 1), 13% by mass of a crosslinking agent (styrene monomer), 6% by mass of a thermoplastic resin (vinyl acetate resin), 2% by mass of a catalyst (t-butyl peroxybenzoate), 4% by mass of an internal release agent (zinc stearate), 40% by mass of an inorganic filler (calcium carbonate) and 25% by mass of a glass fiber (glass fiber diameter: 15 μm) were dispersed in one another to prepare a molding composition. The molding composition was placed in a mold by injection molding as described above, and the mold was heated at a temperature of 140° C. for 2.5 min to cure the composition. The cured product was removed from the mold. Thus, a substrate for a reflector was prepared.

The reflector substrate was subjected to a heat test at 180° C. for 100 hr, and the surface roughness ($R_{max}$) is given in Table 1. The surface roughness was measured by a peak-in-trough measurement.

Further, the reflector substrate was tested for dynamic viscoelasticity (10 Hz, temp. rise rate 5° C. min). The results are shown in FIG. 2.

TABLE 1

| Tg of unsaturated polyester (° C.) | Surface roughness ($R_{max}$) (μm) |
|---|---|
| 130 | 6.5 |
| 140 | 2.6 |
| 150 | 1.3 |
| 160 | 1.0 |

Referring to Table 1, when the $R_{max}$ value is not more than 1.5 μm composition is suitable for use as a reflector. Good surface roughness can be provided when the glass transition temperature of the unsaturated polyester is 150° C. or above.

Referring to FIG. 2, when the glass transition temperature of the unsaturated polyester is 150° C. or above, a satisfactory modulus of elasticity can be maintained, even at a temperature of 180° C., i.e., a temperature to which the reflector will be subjected in use. In particular, when the glass transition temperature is 160° C. or above, satisfactory rigidity can be provided without significant lowering of storage modulus of elasticity.

EXAMPLE 2

Substrates for a reflector were prepared in the same manner as in Example 1, except that an unsaturated polyester having a glass transition temperature of the 160° C. was used and the glass transition temperature of the thermoplastic resin was varied as specified in Table 2.

The molding, shrinkage, surface roughness ($R_{max}$), sink at the reverse face of a flange and modulus of elasticity of bulk molding compounds were measured, and the results are summarized in Table 2.

TABLE 2

| Tg of thermoplastic resin (° C.) | Shrinkage on molding (%) | Surface roughness ($R_{max}$) (μm) | Sink at reverse face of flange (μm) | Modules of elasticity of BMC molded product (MPa) |
|---|---|---|---|---|
| 160 | 0.18 | 3.0 | 120 | 14,900 |
| 150 | 0.14 | 1.5 | 58 | 14,600 |
| 140 | 0.12 | 1.4 | 45 | 14,200 |
| 120 | 0.10 | 1.2 | 18 | 14,000 |
| 100 | 0.07 | 1.1 | 14 | 13,500 |
| 80 | 0.05 | 0.8 | 12 | 12,740 |
| 30 | 0.02 | 0.5 | 8 | 11,270 |
| −10 | 0.01 | 0.4 | 4 | 10,050 |
| −30 | 0.00 | 0.3 | 3 | 8,450 |

TABLE 2-continued

| Tg of thermo-plastic resin (° C.) | Shrinkage on molding (%) | Surface roughness ($R_{max}$) (μm) | Sink at reverse face of flange (μm) | Modules of elasticity of BMC molded product (MPa) |
| --- | --- | --- | --- | --- |
| −90 | 0.00 | 0.3 | 3 | 7,500 |

Preferably, shrinkage on molding is not more than 0.10% the $R_{max}$ value is not more than 1.5 μm, the sink at the reverse face of flange is not more than 20 μm and the modulus of elasticity is not less than 10,000 MPa.

Good resistance to shrinkage on molding and surface roughness are achieved when the glass transition temperature of the thermoplastic resin is 150° C. or below, particularly 120° C. or below. If there is a flange at a portion other than the surface effective for reflection, a glass transition temperature of 150° C. or below for the thermoplastic resin suffices for practical use.

When there is a flange on the reflecting surface, a glass transition temperature of the thermoplastic resin in the range of from −10 to 120° C. is advantageous because the reflecting surface is free from sink and the modulus of elasticity in BMC molded product can be ensured.

EXAMPLE 3

Reflector substrates were prepared in the same manner as in Example 1, except that an unsaturated polyester having a glass transition temperature of 160° C. was used and the glass fiber content was varied as specified in Table 3. The izod impact strength (notched), Charpy impact strength, and surface roughness ($R_{max}$) of the resulting reflector substrates were measured, and the results are summarized in Table 3.

TABLE 3

| Glass fiber content (mass %) | Izod impact strength (notched) (Ncm/cm) | Charpy impact strength (Ncm/cm²) | Surface roughness ($R_{max}$) (μm) |
| --- | --- | --- | --- |
| 4.0 | 30 | 35 | 0.7 |
| 5.0 | 41 | 50 | 0.7 |
| 18.0 | 61 | 61 | 0.9 |
| 30.0 | 49 | 54 | 1.5 |
| 31.0 | 50 | 52 | 1.9 |

Preferably, the reflector has an Izod impact strength (notched) of not less than 40 Ncm/cm and a Charpy impact strength not less than 50 Ncm/cm². Good results in both impact strength and surface roughness are achieved when the glass fiber content is in the range of from 5.0 to 30.0% by mass. when the glass fiber content is excessive, the fluidity during molding may be lowered and surface cracking may occur, resulting in lowered strength.

EXAMPLE 4

Substrates for a reflector were prepared in the same manner as in Example 1, except that an unsaturated polyester having a glass transition temperature of 160° C. was used and the diameter of the glass fiber was varied as specified in Table 4. The rheological viscosity, bending strength and Izod impact strength of the resulting reflector substrates were measured, and the results are summarized in Table 4.

TABLE 4

| Diameter of Glass fiber (μm) | Rheological viscosity (PS) | Bending strength (MPa) | Izod impact strength (Ncm/cm) |
| --- | --- | --- | --- |
| 3 | 185,000 | 79 | 110 |
| 6 | 110,000 | 93 | 104 |
| 13 | 95,000 | 88 | 96 |
| 15 | 88,000 | 76 | 69 |
| 18 | 81,000 | 65 | 57 |
| 20 | 72,000 | 48 | 37 |

Preferably, the reflector has a the rheological viscosity in the range of from 80,000 to 120,000 PS, a bending strength not less than 60 MPa and an Izod impact strength not less than 40 Ncm/cm.

When the diameter of the glass fiber is 3 μm, a problem such as end breakage may occur during the production of the glass fiber, resulting in increased production cost. Further, since the surface area per unit weight of the glass fiber is increased, fluidity necessary for injection molding may not be obtained. On the other hand, when the diameter of the glass fiber is 20 μm, the contract area between the unsaturated polyester resin and the glass fiber is reduced, which may result in lowered bending strength and impact strength. Good results can be obtained when the diameter of the glass fiber is in the range of from 6 to 18 μm.

The thermosetting plastic molding material of the present invention provides a reflector substrate, having excellent heat resistance, dimensional stability, surface smoothness and strength, enabling lamp reflectors having excellent performance to be produced.

Further, in preferred embodiment of the present invention, when the glass transition temperature of the unsaturated polyester resin is at least 150° C. and the thermoplastic resin has a glass transition temperature of 150° C. or below, it is possible to prevent the lowering of the modulus of elasticity of the substrate when the lamp is in an "on" state, thereby enabling the thermal deformation of the reflector substrate to be effectively prevented. Further, the shrinkage on curing of the thermosetting resin can be effectively prevented, enabling a reflecting surface to be formed with good accuracy. Therefore, a good balance of heat resistance and dimensional stability, which are contradictory properties, can be attained.

In particular, in still further preferred embodiments of the present invention, when an unsaturated polyester resin having a glass transition temperature of at least 160° C. is used in combination with an acrylic resin (including a copolymer thereof) or a vinyl acetate resin (also including a copolymer thereof) having a glass transition temperature of 120° C. to −10° C., a lamp reflector substrate having excellent dispensability, dimensional stability, rigidity, and heat resistance, can be attained.

Further, the use of glass fibers having a diameter in the range of from 6 to 18 μm provides suitable fluidity and strength.

Although the present invention has been described in connection with preferred embodiments thereof, many other variations and modifications will become apparent to those skilled in the art without departing from the scope of the invention. It is preferred, therefore, that the present invention not be limited by the specific disclosure herein, but only by the appended claims.

What is claimed is:

1. A molding composition for a lamp reflector, comprising an unsaturated polyester resin, glass fiber, inorganic filler and a thermoplastic resin in an amount effective for preventing shrinkage of the molding composition during curing of the composition to form the lamp reflector, wherein the unsaturated polyester resin is a thermosetting resin, wherein the unsaturated polyester resin has a glass transition temperature of at least 150° C., wherein the thermoplastic resin has a glass transition temperature of 150° C. or below, and wherein the thermoplastic resin comprises a resin selected from the group consisting of acrylic resin and vinyl acetate resin.

2. The molding composition of claim 1, wherein the unsaturated polyester resin has a glass transition temperature of at least 160° C.

3. The molding composition of claim 1, wherein the thermoplastic resin has a glass transition temperature of 120° C. to −10° C.

4. The molding composition of claim 1, wherein the glass fiber has a fiber diameter of 6 to 18 μm.

5. The molding composition of claim 1, wherein the reflector has a surface roughness of not more than 1.5 μm.

6. The molding composition of claim 2, wherein the thermoplastic resin comprises a resin selected from the group consisting of a copolymer of acrylic resin and a copolymer of vinyl acetate resin.

7. A lamp reflector, comprising a lamp reflector substrate produced by molding a composition comprising unsaturated polyester resin, glass fiber, inorganic filler and a thermoplastic resin into an uncured substrate and curing the uncured substrate, the thermoplastic resin preventing shrinkage of the molded composition during the curing; and a metallic reflection coating provided on an interior surface of the substrate, wherein the unsaturated polyester resin is a thermosetting resin, wherein the unsaturated polyester resin has a glass transition temperature of at least 150° C., and wherein the thermoplastic resin has a glass transition temperature of 150° C. or below.

8. The lamp reflector of claim 7, wherein the unsaturated polyester resin has a glass transition temperature of at least 160° C.

9. The lamp reflector of claim 8, wherein the thermoplastic resin is selected from the group consisting of acrylic resin and vinyl acetate resin.

10. The lamp reflector of claim 9, wherein the thermoplastic resin has a glass transition temperature of 120° C. to −10° C.

11. The lamp reflector of claim 7, wherein the glass fiber has a fiber diameter of 6 to 18 μm.

12. The lamp reflector of claim 7, wherein the reflector has a surface roughness of not more than 1.5 μm.

13. The lamp reflector of claim 8, wherein the thermoplastic resin is selected from the group consisting of a copolymer of acrylic resin and a copolymer of vinyl acetate resin.

14. A headlamp, comprising a lamp reflector and a bulb mounted on the lamp reflector, wherein the lamp reflector comprises a reflector substrate produced by molding a composition comprising unsaturated polyester resin, glass fiber, inorganic filler and a thermoplastic resin into an uncured substrate and curing the uncured substrate, the thermoplastic resin preventing shrinkage of the molded composition during the curing; and a metallic reflection coating provided on an interior surface of the substrate, wherein the unsaturated polyester resin is glass transition a thermosetting resin, wherein the unsaturated polyester resin has a glass transition temperature of at least 150° C., and wherein the thermoplastic resin has a glass transition temperature of 150° C. or below.

15. The headlamp of claim 14, wherein the unsaturated polyester resin has a glass transition termperature of at least 160° C.

16. The headlamp of claim 15, wherein the thermoplastic resin is selected from the group consisting of acrylic resin and vinyl acetate resin.

17. The headlamp of claim 16, wherein the thermoplastic resin has a glass transition temperature of 120° C. to −10° C.

18. The headlamp of claim 14, wherein the glass fiber has a fiber diameter of 6 to 18 μm.

19. The headlamp of claim 14, wherein the reflector has a surface roughness of not more than 1.5 μm.

20. The headlamp of claim 14, wherein the thermoplastic resin is selected from the group consisting of a copolymer of acrylic resin and a copolymer of vinyl acetate resin.

* * * * *